United States Patent
Smarsly et al.

(10) Patent No.: US 10,458,001 B2
(45) Date of Patent: Oct. 29, 2019

(54) METHOD FOR PRODUCING A COMPONENT FROM A COMPOSITE MATERIAL COMPRISING A METAL MATRIX AND INCORPORATED INTERMETALLIC PHASES

(71) Applicant: MTU Aero Engines AG, Munich (DE)

(72) Inventors: Wilfried Smarsly, Munich (DE); Markus Fried, Valley (DE)

(73) Assignee: MTU AERO ENGINES AG, Munich (DE)

( * ) Notice: Subject to any disclaimer, the term of this patent is extended or adjusted under 35 U.S.C. 154(b) by 801 days.

(21) Appl. No.: 15/066,186

(22) Filed: Mar. 10, 2016

(65) Prior Publication Data
US 2016/0273074 A1 Sep. 22, 2016

(30) Foreign Application Priority Data
Mar. 17, 2015 (EP) .................... 15159308

(51) Int. Cl.
*C22C 1/04* (2006.01)
*B22F 3/04* (2006.01)
(Continued)

(52) U.S. Cl.
CPC .............. *C22C 1/045* (2013.01); *B22F 3/04* (2013.01); *B22F 3/10* (2013.01); *B22F 3/1039* (2013.01);
(Continued)

(58) Field of Classification Search
CPC ...... B22F 3/04; B22F 3/15; B22F 3/18; B22F 3/17; B22F 3/14; B22F 3/24; B22F 3/20;
(Continued)

(56) References Cited

U.S. PATENT DOCUMENTS

2014/0141281 A1* 5/2014 Kadokura .............. C22C 27/04
428/662
2014/0356215 A1 12/2014 Yamazaki et al.
2015/0056408 A1 2/2015 Kadokura et al.

FOREIGN PATENT DOCUMENTS

EP 2792759 A1 10/2014

OTHER PUBLICATIONS

Yang Y et al: "Multiphase equilibria in the metal-rich region of the Mo—Ti—Si—B-system: thermodynamic prediction and experimental validation", Acta Materialia, Elsevier, Oxford, GB, vol. 53, No. 6, Apr. 1, 2005, pp. 1711-1720.
(Continued)

*Primary Examiner* — Daniel C. McCracken
(74) *Attorney, Agent, or Firm* — Abel Schillinger, LLP (57) ABSTRACT

The present invention relates to a method for producing a component of a composite material comprising a metal matrix and incorporated intermetallic phases, which method comprises
 providing powders of at least one member of the group which comprises pure chemical elements, alloys, chemical compounds and material composites, the powder corresponding overall to the chemical composition which the composite material to be produced is intended to have, each individual powder being different to the chemical composition of the composite material to be produced,
 compacting the powders,
 bonding the powders to one another to form a unit and thermoplastically shaping the unit.

20 Claims, 9 Drawing Sheets

(51) Int. Cl.
  B22F 3/12      (2006.01)
  B22F 3/15      (2006.01)
  C22C 27/04     (2006.01)
  F01D 5/28      (2006.01)
  B22F 3/14      (2006.01)
  B22F 3/17      (2006.01)
  B22F 3/18      (2006.01)
  B22F 3/20      (2006.01)
  B22F 3/24      (2006.01)
  C22C 30/00     (2006.01)
  B23K 26/21     (2014.01)
  B23K 26/323    (2014.01)
  B22F 3/10      (2006.01)
  B23K 13/01     (2006.01)
  B23K 15/00     (2006.01)
  B23K 20/02     (2006.01)
  B23K 20/12     (2006.01)
  B23K 20/22     (2006.01)
  B23K 101/00    (2006.01)
  B23K 103/18    (2006.01)
  B22F 5/04      (2006.01)
  B33Y 10/00     (2015.01)
  B33Y 70/00     (2015.01)
  B33Y 80/00     (2015.01)

(52) U.S. Cl.
  CPC ............ *B22F 3/12* (2013.01); *B22F 3/14* (2013.01); *B22F 3/15* (2013.01); *B22F 3/17* (2013.01); *B22F 3/18* (2013.01); *B22F 3/20* (2013.01); *B22F 3/24* (2013.01); *B23K 13/01* (2013.01); *B23K 15/0093* (2013.01); *B23K 20/02* (2013.01); *B23K 20/12* (2013.01); *B23K 20/22* (2013.01); *B23K 26/21* (2015.10); *B23K 26/323* (2015.10); *C22C 1/0491* (2013.01); *C22C 27/04* (2013.01); *C22C 30/00* (2013.01); *F01D 5/282* (2013.01); *F01D 5/286* (2013.01); *F01D 5/288* (2013.01); *B22F 5/04* (2013.01); *B22F 2003/175* (2013.01); *B22F 2301/20* (2013.01); *B22F 2998/10* (2013.01); *B23K 2101/001* (2018.08); *B23K 2103/18* (2018.08); *B33Y 10/00* (2014.12); *B33Y 70/00* (2014.12); *B33Y 80/00* (2014.12); *F05D 2230/22* (2013.01); *F05D 2230/233* (2013.01); *F05D 2230/234* (2013.01); *F05D 2230/236* (2013.01); *F05D 2230/239* (2013.01); *F05D 2230/25* (2013.01); *F05D 2230/42* (2013.01); *F05D 2300/13* (2013.01); *F05D 2300/131* (2013.01); *F05D 2300/172* (2013.01); *F05D 2300/177* (2013.01); *F05D 2300/222* (2013.01); *Y02T 50/672* (2013.01); *Y02T 50/6765* (2018.05)

(58) Field of Classification Search
  CPC .. B22F 3/1039; B22F 3/10; B22F 3/12; B22F 5/04; B22F 2301/20; B22F 2998/10; C22C 1/0491; C22C 27/04; C22C 30/00; F01D 5/282; F01D 5/286; F01D 5/288; B23K 20/22; B23K 20/12; B23K 20/02; B23K 15/0093; B23K 13/01; B23K 26/323; B23K 26/21; B23K 2103/18; B23K 2101/001; F05D 2230/22; F05D 2300/131; F05D 2300/13; F05D 2003/175; F05D 2300/222; F05D 2300/177; F05D 2300/172; F05D 2230/239; F05D 2230/236; F05D 2230/234; F05D 2230/233; F05D 2230/42; F05D 2230/25; B33Y 80/00; B33Y 70/00; B33Y 10/00; Y02T 50/672
  See application file for complete search history.

(56) References Cited

OTHER PUBLICATIONS

Yang Y et al: "Effects of Ti, Zr, and Hf on the phase stability of Mo ss+Mo3Si+Mo5SiB2 alloys at 1600<o>C", Acta Materialia, Elsevier, Oxford, GB, vol. 58, No. 2, Jan. 1, 2010, pp. 541-548.

Daniel Schliephake et al: "High-Temperature Creep and Oxidation Behavior of Mo—Si—B Alloys with High Ti Contents", Metallurgical and Materials Transactions A, vol. 45, No. 3, Aug. 23, 2013, pp. 1102-1111.

M. A. Azim et al: "Creep Resistance and Oxidation Behavior of Novel Mo—Si—B—Ti Alloys", JOM, Aug. 8, 2015.

* cited by examiner

METHOD FOR PRODUCING A COMPONENT FROM A COMPOSITE MATERIAL COMPRISING A METAL MATRIX AND INCORPORATED INTERMETALLIC PHASES

CROSS-REFERENCE TO RELATED APPLICATIONS

The present application claims priority under 35 U.S.C. § 119 of European Patent Application No. 15159308.4, filed Mar. 17, 2015, the entire disclosure of which is expressly incorporated by reference herein.

BACKGROUND OF THE INVENTION

1. Field of the Invention

The present invention relates to a method for producing a component from a composite material comprising a metal matrix and incorporated intermetallic phases, i.e. from a so-called MIC composite material (MIC: Metal-Intermetallic Composite). The present invention furthermore relates to a corresponding component, in particular consisting of a molybdenum alloy with incorporated silicides.

2. Discussion of Background Information

In turbomachines, such as static gas turbines and aircraft engines, the materials used must satisfy stringent requirements in various property ranges depending on the field of use, for example the lowest possible weight together with high strength, high-temperature stability, vibration stability etc. Correspondingly, there is a need to develop new materials which comply with the demanding property profile for use in static gas turbines or aircraft engines. However, materials which have high strengths at high temperatures are often difficult to process, so that great outlay and therefore high costs are entailed in the production of corresponding components. This is, inter alia, often because such materials have only a low deformability, which makes the component manufacture more difficult.

For example, molybdenum alloys with portions of silicon and boron as well as further alloy elements, which forms intermetallic phases such as silicides, are advantageous for use in high-temperature environments, since they have melting temperatures of more than 2000° C. and possess suitable mechanical properties. However, the production of such MIC materials based on molybdenum is difficult to carry out and very elaborate.

Thus, attempts have already been made to produce by mechanical alloying, from powders which respectively consist of a chemical element corresponding to the desired composition, powder particles which have the desired chemical composition of the material, in order then to process the latter by compaction and sintering as well as hot isostatic pressing and extrusion to process a corresponding component.

However, the mechanical alloying is elaborate and during mechanical alloying, for example by grinding, the auxiliaries used, such as grinding containers, grinding balls, grinding auxiliaries and the like, introduce extraneous substances into the powder so that the material is contaminated.

Furthermore, attempts have also been made to produce from pure elemental powders, i.e. powders which comprise only particles of a single chemical element, by compaction, then sintering and spraying of a corresponding material block, to produce powder particles which have the desired chemical composition in order to produce a corresponding component with these powder particles by generative production methods such as selective laser melting, or by extrusion or by conventional powder-metallurgical shaping. In these methods, however, the problem arises that impurities can be introduced into the metal during the spraying, for example by oxidation, gas inclusions or the like. Furthermore, this method with the various method steps of mixing the elemental powders, compacting, bonding and inert-gas spraying and subsequent powder-metallurgical shaping with recompaction, is very elaborate.

In view of the foregoing, it would be advantageous to have available a method for producing components from so-called MIC materials (composite materials of a metal matrix and incorporated intermetallic phases, so-called metal-intermetallic composites) and in particular from molybdenum alloys with incorporated silicides, with which contamination of the material can be substantially avoided or at least reduced and the production can be simplified.

SUMMARY OF THE INVENTION

The present invention provides method for producing a component of a composite material which comprises a metal matrix and incorporated (e.g., embedded) intermetallic phases. The method comprises:

providing two or more powders of at least one member from the group of one or more of pure chemical elements, alloys, chemical compounds and material composites, the powders corresponding overall to a chemical composition which the composite material to be produced is intended to have, each individual powder having a chemical composition which is different from the chemical composition of the composite material to be produced, compacting the powders, bonding the powders to one another to form a unit and thermoplastically shaping the unit.

In one aspect of the method, compaction and/or bonding of the powders and/or thermoplastic shaping of the unit may be carried out in a combined process. Alternatively, it may be carried out in separate individual steps.

In another aspect, the powders may be mixed prior to compaction of the powders.

In yet another aspect of the method of the invention, finishing may be carried out after the thermoplastic shaping. The finishing may comprise at least one of a heat treatment, a mechanical finishing, a surface treatment, and coating.

In a still further aspect of the method of the invention, the powders may comprise one or more of elemental particles, alloy particles, coated particles, particles of intermetallic phases, chemical compounds and/or the metal matrix may be formed by a molybdenum alloy in which silicides are incorporated.

In yet another aspect of the method, the compaction may be carried out by cold pressing and/or the bonding may be carried out by sintering.

In another aspect, the compaction and bonding of the powders may comprise one or more of pressure sintering, hot pressing, hot pressing of preferably precontoured evacuated capsules, hot isostatic pressing.

In a still other aspect, prior to the thermoplastic deformation at least one unit, preferably a plurality of units with a different chemical composition, may be melted, in particular melted layerwise, and subsequently resolidified, in particular directionally solidified.

In another aspect of the method of the present invention, the thermoplastic deformation may be carried by one or more of hot pressing, hot pressing of preferably precontoured evacuated capsules, hot isostatic pressing, die forging, isothermal die forging, hot die forging, rolling, hammering, extrusion, freeform forging.

In another aspect, after the thermoplastic shaping a heat treatment may be carried out at a temperature in the range from 100° C. to 200° C. below the recrystallization temperature.

In yet another aspect, the composition of the composite material to be produced from the powders may be as follows:
from 40 at % to 55 at % molybdenum, e.g., from 45 at % to 52 at % molybdenum,
from 5 at % to 20 at % silicon, e.g., from 8 at % to 15 at % silicon,
from 5 at % to 15 at % boron, e.g., from 7 at % to 10 at % boron,
from 20 at % to 40 at % titanium, e.g., from 25 at % to 30 at % titanium,
from 1 at % to 5 at % iron, e.g., from 1 at % to 3 at % iron,
from 0 at % to 5 at % yttrium, e.g., from 0 at % to 3 at % yttrium,
from 0 at % to 5 at % hafnium, e.g., from 0 at % to 3 at % hafnium,
from 0 at % to 5 at % zirconium, e.g., from 0 at % to 2 at % zirconium,
from 0 at % to 5 at % niobium, e.g., from 0 at % to 2 at % niobium,
from 0 at % to 1 at % tungsten, e.g., from 0 at % to 2 at % tungsten,
and unavoidable impurities.

The present invention also provides a component which is produced by the method of the present invention as set forth above (including the various aspects thereof).

In one aspect, the component may be a component of a turbomachine, for example, a component for an aircraft engine.

The underlying concept of the invention consists in not producing powders with the desired chemical composition of the component to be produced, so that the mechanical alloying or the spraying can be avoided in the above-described methods of the prior art, so that both the production process can be simplified and a source of contamination can be eliminated.

Instead, it is proposed to use, for the production of a corresponding component, powders which either consist of the pure chemical elements and/or are formed by alloys and/or chemical compounds and/or material composites and correspond together in their chemical composition to that of the material from which the component to be produced is intended to be made, the shrinkage during the production process already being taken into account. The powders used, and therefore alloy powders or powders of material composites, are however different in their chemical composition to that which the component to be produced is intended to have, so that powder production of a powder with the chemical composition of the desired material, and therefore mechanical alloying or spraying, can be avoided. For example, coated powder particles may be envisioned as material composites.

For example, powders of pure molybdenum and/or molybdenum alloys, for example alloys with tungsten, niobium, titanium, iron, zirconium, may be mixed with silicide powders with the composition $Mo(Ti)_5SiB_2$ and/or $Mo(Ti)_5Si_3$, in which case the molybdenum in the named intermetallic compounds may be partially replaced with titanium, as is indicated by the teem in brackets. Furthermore, the molybdenum alloys may optionally contain yttrium and/or hafnium. As an alternative, pure elemental powders of molybdenum, silicon, boron, titanium, iron, zirconium, tungsten and/or niobium, and optionally yttrium and/or hafnium, may be mixed.

The composite material to be produced from the powders may have the following composition: from 40 at % to 55 at % molybdenum, preferably from 45 at % to 52 at % molybdenum; from 5 at % to 20 at % silicon, preferably from 8 at % to 15 at % silicon; from 5 at % to 15 at % boron, preferably from 7 at % to 10 at % boron; from 20 at % to 40 at % titanium, preferably from 25 at % to 30 at % titanium; from 1 at % to 5 at % iron, preferably from 1 at % to 3 at % iron; up to 5 at % yttrium, preferably up to 3 at % yttrium; up to 5 at % hafnium, preferably up to 3 at % hafnium; up to 5 at % zirconium, preferably up to 2 at % zirconium; up to 5 at % niobium, preferably up to 2 at % niobium; up to 2 at % tungsten, preferably up to 1 at % tungsten; and unavoidable impurities. Such a composition of the final mixture has advantageous properties with a balanced property profile in terms of creep resistance, static strength, fracture toughness, ductility, oxidation resistance and low density.

It is furthermore proposed that the powders provided should be compacted, bonded to one another to form a unit, and that a corresponding unit be subjected to thermoplastic shaping, thermoplastic shaping being intended to mean plastic deformation of the corresponding unit at high temperatures, i.e. temperatures which usually lie above the value of one third of the melting temperature, preferably above half the melting temperature. With these method steps, it is possible to make from the above-described powders a component which has a homogeneous chemical composition of the metal matrix and a likewise homogeneous distribution of the precipitated intermetallic phases, as well as freedom from porosity with a high material purity.

The steps of compaction and/or bonding of the powders and/or the thermoplastic shaping of the unit may be carried out in a combined process or in separate individual steps.

A combination of the compaction of the powders, the bonding of the powders and the thermoplastic shaping may, for example, be carried out by hot pressing with a mechanical press, in which case the powder materials may preferably be contained during the hot pressing in an evacuated capsule which encloses the powder particles. In this case, the capsule used may be precontoured, which is advantageous but not compulsory. In the case of combining compaction and bonding of the powders, as well as sometimes the thermoplastic shaping, it is furthermore possible to use pressure sintering and hot isostatic pressing. The combination of individual method steps, i.e. of the compaction, the bonding and the thermoplastic deformation, may therefore also relate only to parts of these steps, i.e. for example only to the compaction and bonding. Furthermore, individual steps may be carried out in a combination and also additionally in individual steps, for example subsequent hot isostatic pressing in addition to the hot pressing.

The compaction of the powder particles in an individual step may be carried out by cold pressing, and in particular isostatic cold pressing.

The bonding of the particles after preceding compaction may be carried out by sintering, particularly in a protective gas atmosphere or a reducing hydrogen atmosphere, or in a vacuum.

The thermoplastic deformation of powder particles compacted and bonded to form a unit may be carried out by hot pressing, hot pressing of optionally precontoured evacuated capsules with the unit contained therein, hot isostatic pressing, die forging, isothermal die forging, hot die forging, rolling, hammering, extrusion and freeform forging.

Before the compaction of the powder particles, the various powders used may additionally be mixed in order to obtain a homogeneous distribution of the various powder particles. The mixing must, however, be distinguished from mechanical alloying during which, for example, additional energy for mechanical alloying is introduced by corresponding grinding bodies. In the present invention, mechanical alloying does not take place, but only homogeneous mixing of various powders used.

After the thermoplastic shaping, when there is already a corresponding semifinished product of the component, which may also already be formed very close to final contour, finishing may be carried out, which may comprise a heat treatment, mechanical processing, surface treatment, and/or coating. A surface treatment may, for example, be solidification, for instance by rolling and/or irradiation. In particular, a heat treatment at a temperature in the range of from 100° C. to 200° C. below the recrystallization temperature may be carried out after the thermoplastic shaping.

Before the thermoplastic deformation, at least one unit, preferably a plurality of units, and in particular a plurality of units with a different chemical composition, may be melted, and in particular melted layerwise, in order after resolidification to provide a unit for the subsequent thermoplastic deformation. By layerwise melting of units of compacted and bonded powder with different chemical compositions, a graded structure of the component can be achieved, so that, for example during the production of a turbine blade, the blade root may have a chemical composition which has a higher ductility than the chemical composition which is present in the blade surface region, in order to achieve better creep resistance there.

The melting of the units may take place in electron beam furnaces.

During the solidification, the cooling may be carried out in a furnace with adjusted temperature gradients so that a directionally solidified semifinished product with anisotropic properties can be produced.

BRIEF DESCRIPTION OF THE DRAWINGS

In the appended drawings.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
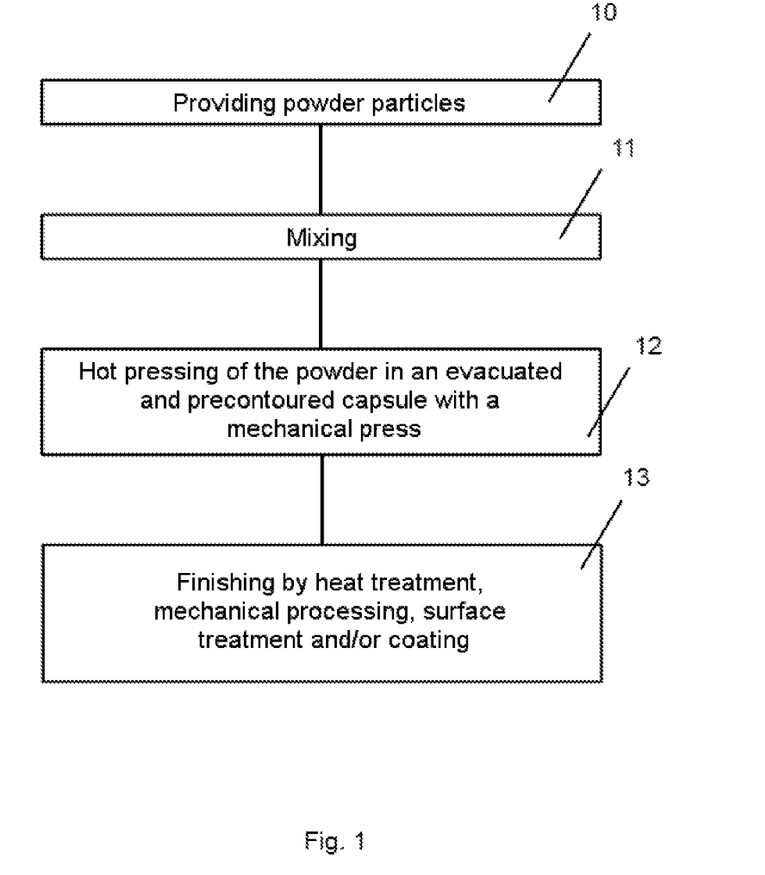
FIG. 1 shows a flowchart of a first embodiment.

In the first embodiment according to FIG. 1, powders of pure metal particles, i.e. particles which contain only one chemical element, alloy particles which are formed from alloys, as well as coated particles and/or particles of intermetallic phases and/or chemical compounds, all of which differ individually from the chemical composition of the component to be produced, are provided in the corresponding proportion (Step 10) so that together, taking into account shrinkages during the production method, the chemical composition of the component to be produced can be achieved. For example, particles of pure molybdenum and/or molybdenum alloys, for example alloys with tungsten, niobium, titanium, iron, zirconium, may be mixed with silicide powders with the composition $Mo(Ti)_5SiB_2$ and/or $Mo(Ti)_5Si_3$, in which case the molybdenum in the intermetallic compounds may be partially replaced with titanium, as is indicated by the term in brackets. Furthermore, the molybdenum alloys may optionally contain yttrium and/or hafnium. As an alternative, pure elemental powders of molybdenum, silicon, boron, titanium, iron, zirconium, tungsten and/or niobium, and optionally yttrium and/or hafnium, may be mixed.

Advantageous properties of the final mixture with a balanced property profile in terms of creep resistance, static strength, fracture toughness, ductility, oxidation resistance and low density, have been achieved with the following exemplary compositions (data respectively in at %), which may also comprise small amounts of other elements as unavoidable impurities:

| molybdenum | silicon | boron | titanium | iron | yttrium | zirconium | niobium | Tungsten |
|---|---|---|---|---|---|---|---|---|
| 49.5 | 12.5 | 8.5 | 27.5 | 2.0 | 0 | 0 | 0 | 0 |
| 48.5 | 13.5 | 8.5 | 26.5 | 2.0 | 0 | 1.0 | 0 | 0 |
| 51 | 10.0 | 8.5 | 27.5 | 2.0 | 0 | 1.0 | 0 | 0 |
| 46.5 | 12.5 | 8.5 | 27.5 | 2.0 | 2.0 | 1.0 | 0 | 0 |
| 46.5 | 12.5 | 8.5 | 27.5 | 2.0 | 2.0 | 0 | 1.0 | 0 |
| 46.5 | 12.5 | 8.5 | 27.5 | 2.0 | 2.0 | 0 | 0 | 1.0 |

In these compositions, yttrium may optionally be replaced partially or fully with hafnium.

These powder particles are mixed (Step 11) and subsequently introduced into a capsule which may already be precontoured in a manner similar to the component to be produced, i.e. it may have a similar shape to the component to be produced. Although the precontouring of the capsule is often advantageous, it is not compulsory. Instead, the capsule may also have a shape which is not close to final contour, for example a cylindrical shape when the final component is intended to be a blade. The final shape of the component may in such a case be achieved by a subsequent method step in which material is removed, for example by erosion or milling.

The capsule is—except of course from the powder particles with which it is filled—evacuated, then closed and subsequently subjected in a mechanical press to a hot pressing method (Step 12), in which both the compaction of the powder and the bonding of the powder particles to one another and the thermoplastic shaping take place in one step.

Subsequently, the component produced in this way may be subjected to a heat treatment in order to adjust the structure in the desired way and/or to eliminate internal stresses. Mechanical finishing may then be carried out, during which the capsule may for example be removed. The mechanical processing may be followed by further steps of surface treatment and coating with oxidation protection layers and/or antiwear layers (Step 13).

Figure 2:
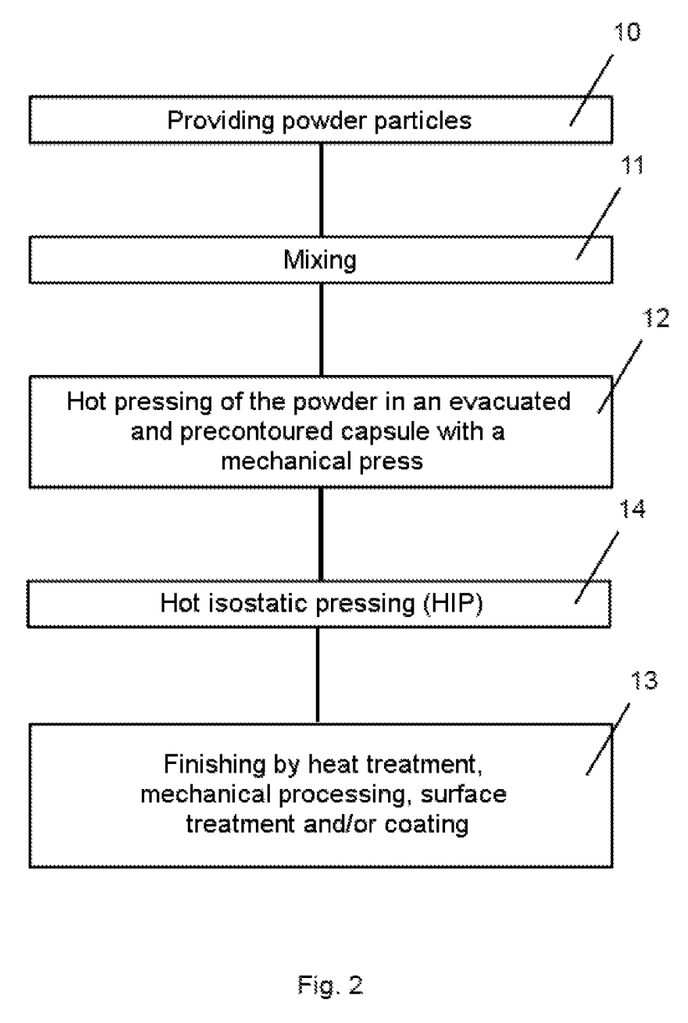
FIG. 2 shows a flowchart of a second embodiment.

In another configuration of the invention, the method sequence which is represented in FIG. 2 may be carried out in a similar way to the first embodiment explained above, in which case a further step of recompaction by hot isostatic pressing (Step 14) may additionally be carried out in the second embodiment. In the case of a molybdenum alloy with incorporated silicides, this may for example be carried out at a temperature of 1500° C. for four hours.

Figure 3:
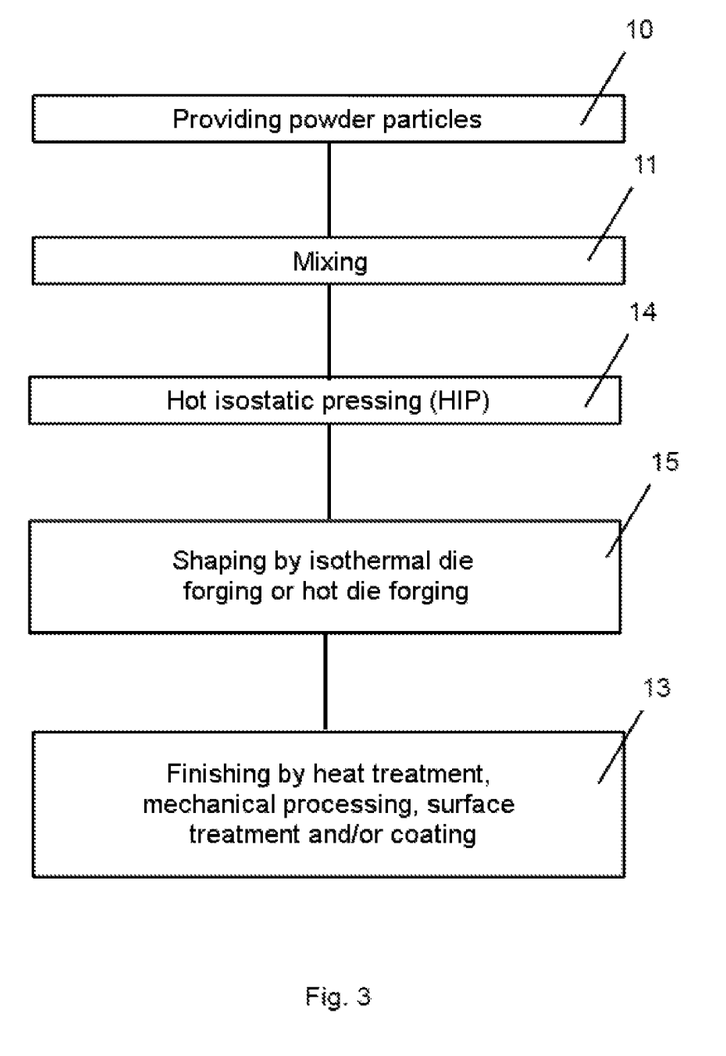
FIG. 3 shows a flowchart of a third embodiment.

In the third embodiment, the flowchart of which is shown in FIG. 3, the hot pressing of the powder in an evacuated and optionally precontoured capsule is replaced with hot isostatic pressing (Step 14), in which case thermoplastic shaping by isothermal die forging or hot die forging may additionally be carried out (Step 15). It is also conceivable, in the case of the method according to the flowchart in FIG. 3, to omit this hot isostatic pressing (Step 14) and instead carry out thermoplastic shaping exclusively by isothermal die forging or hot die forging.

Figure 4:
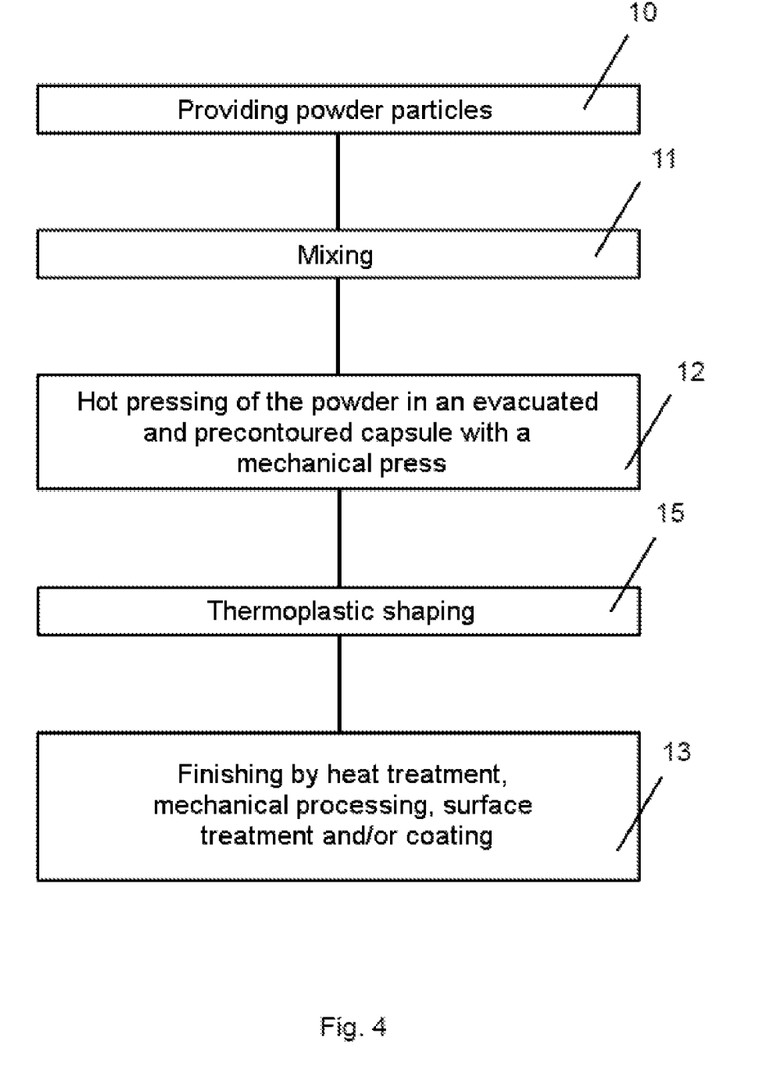
FIG. 4 shows a flowchart of a fourth embodiment.

In a fourth embodiment (FIG. 4), which substantially corresponds to the first embodiment, in addition to the hot pressing (Step 12), subsequent thermoplastic shaping by die forging, isothermal die forging, extrusion, hammering, freeform forging or rolling may be carried out (Step 15).

Figure 5:
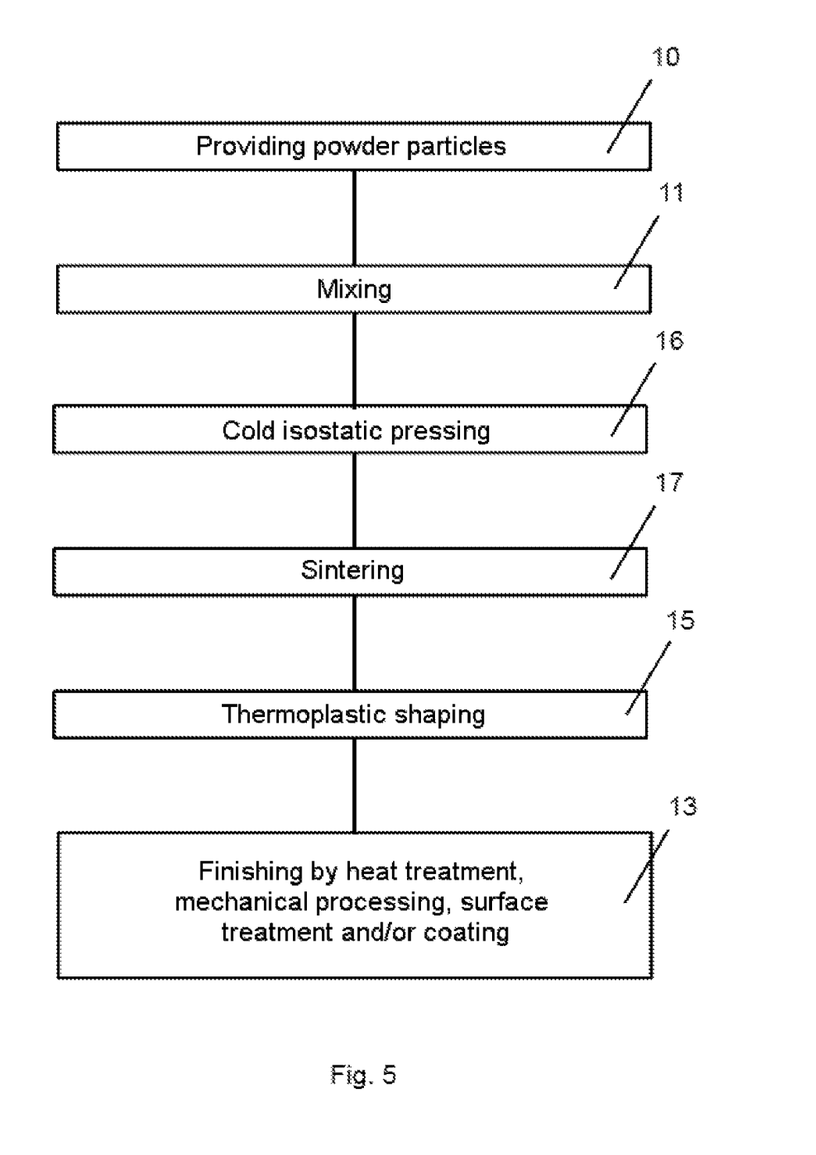
FIG. 5 shows a flowchart of a fifth embodiment.

In the fifth embodiment (FIG. 5), which does not differ from the previous embodiments in terms of the provision of the powders (Step 10) and the mixing of the powders (Step 11), the steps of compaction and bonding of the powder particles are carried out separately, specifically on the one hand by cold isostatic pressing (Step 16) and on the other hand by sintering (Step 17). A unit produced in this way from the powder particles is then subjected to thermoplastic shaping (Step 15) in the form of die forging (isothermal die forging or hot die forging). As an alternative or in addition, the thermoplastic shaping may also be carried out by hot isostatic pressing by hammering, in particular swaging, extrusion, freeform forging or rolling.

Figure 6:
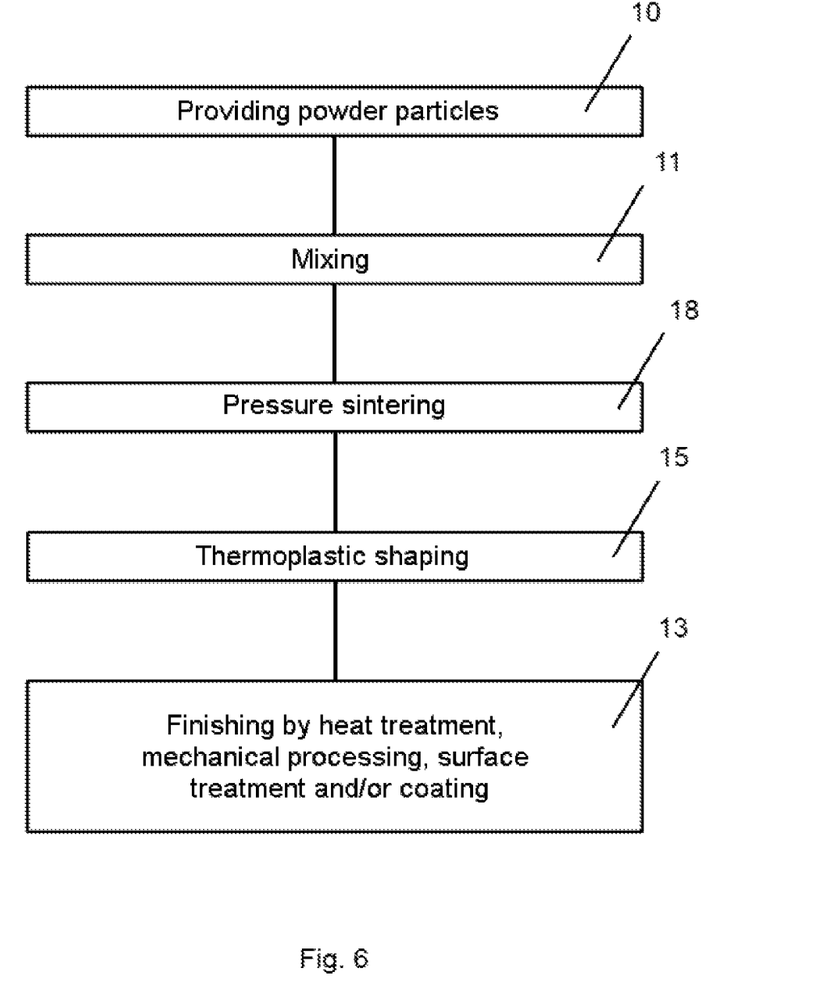
FIG. 6 shows a flowchart of a sixth embodiment.

In a sixth embodiment (FIG. 6), the steps of compaction and bonding of the powders may be combined in one step, in particular by pressure sintering (Step 18).

Figure 7:
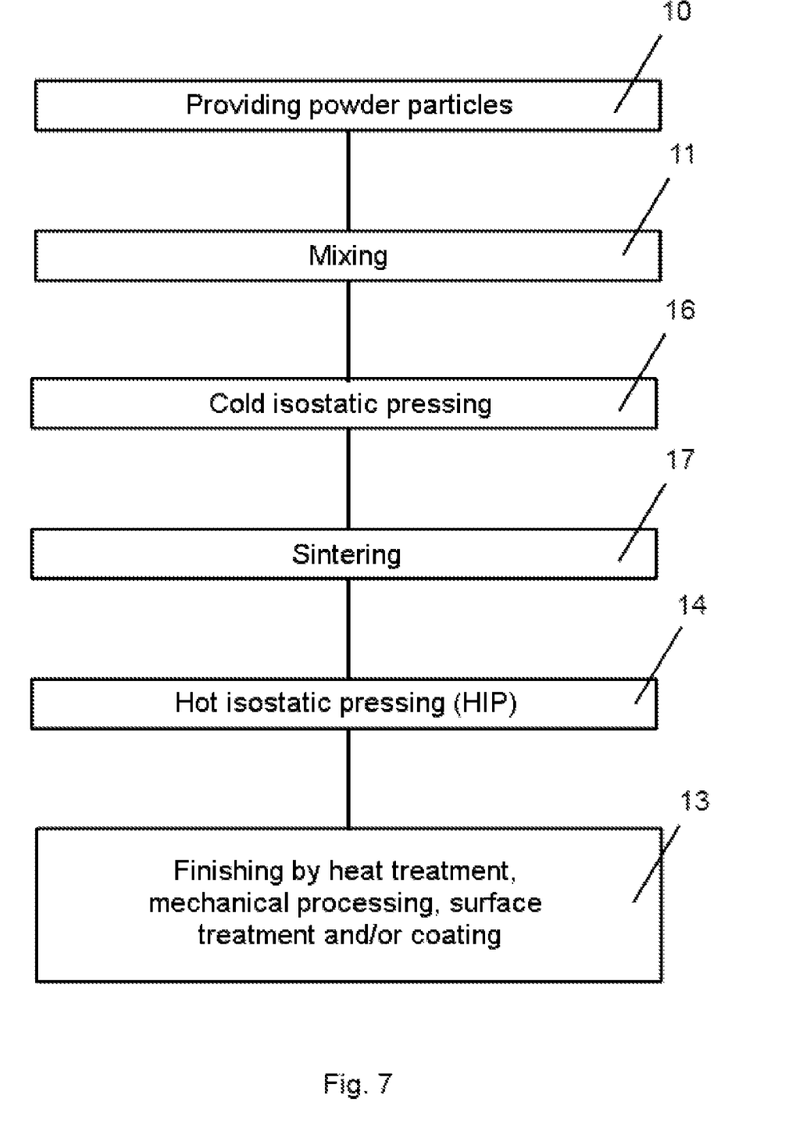
FIG. 7 shows a flowchart of a seventh embodiment.

In the seventh embodiment (FIG. 7), as in the first embodiment, the previously provided powders are again initially mixed (Step 11). After the mixing, the powders are cold-pressed (Step 16) and subsequently sintered at temperatures of between 1000° C. and 1800° C. in a hydrogen atmosphere (Step 17). Hot isostatic pressing (HIP) is then carried out at from 1200° C. to 1500° C. for from two to six hours at a pressure of from 100 to 200 MPa (Step 14). In addition or as an alternative, isothermal die forging or hot die forging, as well as other forms of thermoplastic deformation such as swaging, extrusion, freeform forging or rolling may be carried out. Subsequently, a heat treatment may be carried out at a temperature in the range from 100° C. to 200° C. below the recrystallization temperature for from five to thirty hours in an air atmosphere or in an inert atmosphere, and cooling may be carried out in the furnace, so that internal stresses may be relaxed and/or corresponding structural adjustments may be carried out (Step 13). Depending on the material, the temperature during the heat treatment may, for example, lie between 1000° C. and 1500° C.

Figure 8:
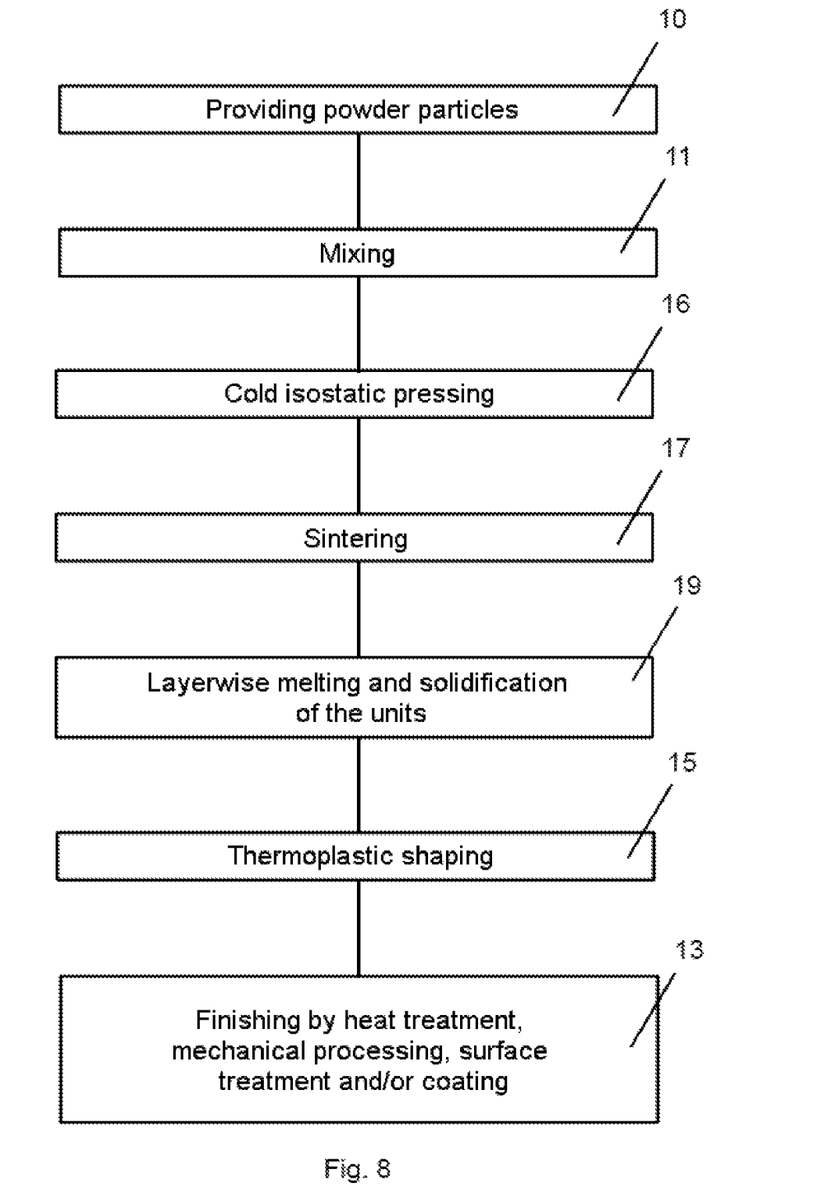
FIG. 8 shows a flowchart of an eighth embodiment.

In another embodiment (FIG. 8), the previously provided powders are again initially mixed, subsequently cold-pressed (Step 16) and again sintered at temperatures of between 1000° C. and 1800° C. in a hydrogen atmosphere (Step 17). A material unit obtained in this way is combined with other units, which have a different chemical composition, in such a way that, by layerwise melting in an electron beam furnace with subsequent solidification, a semifinished product is obtained which has different properties because of the differing chemical composition over the component (Step 19). It is thus possible to produce a semifinished product which has better ductility in one region than in another region, while conversely the creep resistance is lower in the ductile region than in the non-ductile region. Correspondingly, a turbine blade in which the ductile region forms the blade root and the creep-resistant region forms the blade surface could be produced from the semifinished product. The corresponding semifinished product is subsequently shaped by thermoplastic deformation to form the desired component (Step 15). Again, die forging, hammering, extrusion, freeform forging or rolling may be used as methods. A subsequent heat treatment (Step 13) may be carried out by means of an induction coil in an air atmosphere or in an inert atmosphere, specifically at temperatures in the range of from 100° C. to 200° C. below the recrystallization temperature for from five to thirty hours. The heat treatment with the induction coil may be carried out homogeneously over the entire component or partially, or with a temperature gradient. A partial heat treatment may be adapted to the different chemical compositions of the component.

In another embodiment (FIG. 9), a unit is again formed from elemental powders by cold pressing and sintering in a hydrogen atmosphere at temperatures of between 1000° C. and 1800° C. The one or more corresponding units are then melted in an electron beam furnace and, during the solidification in the furnace, suitable temperature gradients are set up so that a directionally solidified semifinished product with anisotropic properties is formed (Step 20). For example, the creep resistance can be formed particularly well by the anisotropy set up in a privileged direction, so that this component direction is aligned in the future component, for example a turbine blade, according to the load direction in relation to the creep loading.

Figure 9:
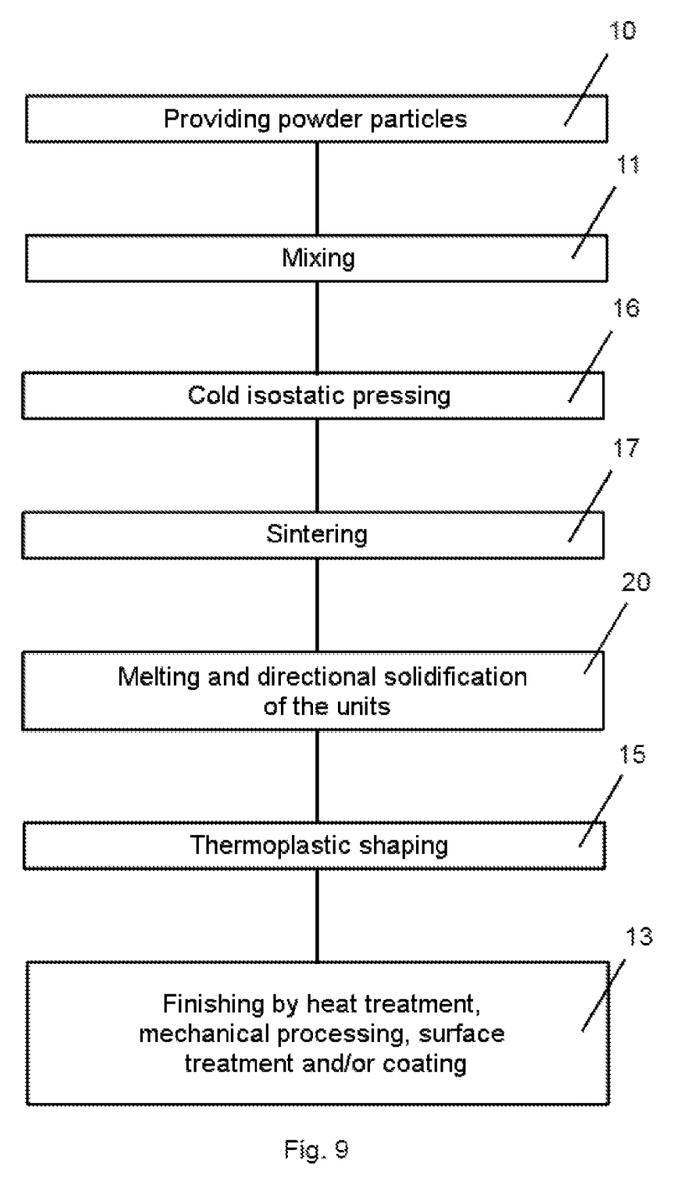
FIG. 9 shows a flowchart of a ninth embodiment.

The component produced thereby is in turn subjected to a thermoplastic shaping and a subsequent heat treatment, as they have been described in the two preceding embodiments.

In another embodiment, a unit is again produced from elemental powders by cold pressing and sintering at temperatures of between 1000° C. and 1800° C. in a hydrogen atmosphere. In this embodiment as well, the units produced in this way are melted in an electron beam furnace and subsequently subjected to a thermoplastic method as well as a heat treatment, such as were described in the previous exemplary embodiments. The solidification, however, is carried out not as directional solidification as in the previous exemplary embodiment but as homogeneous solidification.

By the described methods and embodiments, a process for producing components from metal-intermetallic composites (MIC), and in particular molybdenum alloy with incorporated intermetallic silicide compounds, is provided, which has a lower susceptibility to impurities and in particular to gas inclusions because of the method steps carried out, which improves the deformability of the material. The avoidance of impurities, for example inclusions, furthermore increases the reliability and lifetime of the component. This is also achieved by reducing the porosity by the thermoplastic shaping process, in which case the tensile strength may also be increased by the thermoplastic shaping. Overall, for the production of corresponding materials, fewer process steps are required, which are less elaborate, so that in particular an advantageous production method is obtained.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for producing a component of a composite material comprising a metal matrix and incorporated intermetallic phases, wherein the method comprises:
   providing powders of at least one member from the group which comprises pure chemical elements, alloys, chemical compounds and material composites, the powders corresponding overall to a chemical composition of the composite material of the component, each individual powder having a chemical composition which is different from the chemical composition of the composite material of the component,
   compacting the powders,
   bonding the powders to one another to form a unit and thermoplastically shaping the unit, the composition of the composite material of the component being as follows:
   from 40 at % to 55 at % molybdenum,
   from 5 at % to 20 at % silicon,
   from 5 at % to 15 at % boron,
   from 20 at % to 40 at % titanium,
   from 1 at % to 5 at % iron,
   from 0 at % to 5 at % yttrium,
   from 0 at % to 5 at % hafnium,
   from 0 at % to 5 at % zirconium,
   from 0 at % to 5 at % niobium,
   from 0 at % to 2 at % tungsten,
   and unavoidable impurities.

2. The method of claim 1, wherein compaction and/or bonding of the powders and/or thermoplastic shaping of the unit are carried out in a single step.

3. The method of claim 1, wherein compaction and/or bonding of the powders and/or thermoplastic shaping of the unit are carried out in separate individual steps.

4. The method of claim 1, wherein prior to compaction of the powders the powders are mixed.

5. The method of claim 1, wherein after the thermoplastic shaping, finishing is carried out, the finishing comprising at least one of a heat treatment, a mechanical finishing, a surface treatment, and coating.

6. The method of claim 1, wherein the powders comprise one or more of elemental particles, alloy particles, coated particles, particles of intermetallic phases, chemical compounds.

7. The method of claim 1, wherein the metal matrix is formed by a molybdenum alloy in which silicides are incorporated.

8. The method of claim 1, wherein the compaction is carried out by cold pressing.

9. The method of claim 1, wherein the bonding is carried out by sintering.

10. The method of claim 1, wherein the compaction and bonding of the powders comprises one or more of pressure sintering, hot pressing, hot pressing of evacuated capsules, hot isostatic pressing.

11. The method of claim 1, wherein prior to the thermoplastic deformation at least one unit is melted and subsequently resolidified.

12. The method of claim 1, wherein the thermoplastic deformation is carried out by one or more of hot pressing, hot pressing of evacuated capsules, hot isostatic pressing, die forging, isothermal die forging, hot die forging, rolling, hammering, extrusion, freeform forging.

13. The method of claim 1, wherein after the thermoplastic shaping a heat treatment is carried out at a temperature in a range from 100° C. to 200° C. below a recrystallization temperature.

14. The method of claim 1, wherein the composition of the composite material of the component is as follows:
   from 45 at % to 52 at % molybdenum,
   from 8 at % to 15 at % silicon,
   from 7 at % to 10 at % boron,
   from 25 at % to 30 at % titanium,
   from 1 at % to 3 at % iron,
   from 0 at % to 3 at % yttrium,
   from 0 at % to 3 at % hafnium,
   from 0 at % to 2 at % zirconium,
   from 0 at % to 2 at % niobium,
   from 0 at % to 1 at % tungsten,
   and unavoidable impurities.

15. The method of claim 1, wherein the composition of the composite material of the component comprises one or more of:
   from 45 at % to 52 at % molybdenum,
   from 8 at % to 15 at % silicon,
   from 7 at % to 10 at % boron,
   from 25 at % to 30 at % titanium,
   from 1 at % to 3 at % iron,
   from 0 at % to 3 at % yttrium,
   from 0 at % to 3 at % hafnium,
   from 0 at % to 2 at % zirconium,
   from 0 at % to 2 at % niobium,
   from 0 at % to 1 at % tungsten,
   and unavoidable impurities.

16. The method of claim 1, wherein the component is a component of a turbomachine.

17. The method of claim 1, wherein the component is component of an aircraft engine.

18. The method of claim 1, wherein powders of pure molybdenum and/or molybdenum alloys are mixed with silicide powders.

19. The method of claim 18, wherein the silicide powders comprise one or both of Mo(Ti)$_5$SiB$_2$ and/or Mo(Ti)$_5$Si$_3$.

20. The method of claim 1, wherein pure element powders are mixed.

\* \* \* \* \*